Nov. 4, 1969  C. E. WEST, JR., ET AL  3,475,992
POWER TRANSMISSION

Filed Dec. 26, 1967  2 Sheets-Sheet 2

INVENTORS.
Charles E. West, Jr. &
Jack W. Schmidt a. M. Heiter
ATTORNEY

United States Patent Office 3,475,992
Patented Nov. 4, 1969

3,475,992
POWER TRANSMISSION
Charles E. West, Jr., Speedway, and Jack W. Schmidt, Indianapolis, Ind., assignors to General Motors Corporation, Detroit, Mich., a corporation of Delaware
Filed Dec. 26, 1967, Ser. No. 693,208
Int. Cl. F16h 57/10, 57/04
U.S. Cl. 74—759                                    20 Claims

ABSTRACT OF THE DISCLOSURE

A power transmission having input and output means with a range unit, having a plurality of friction devices with common supporting means, a splitter unit, and a reverse unit to provide a plurality of forward and reverse drive ratios therebetween is disclosed. The input means in combination with an element of the range unit provide lubrication and pressurizing systems for the splitter unit.

---

The transmission, as illustrated, has a four-ratio range unit driven by the input shaft, a two-ratio splitter unit driven by an element of the range unit and adapted to drive an output member, and a reverse unit operatively connected between the range unit and the output member. Selective actuation of friction devices in the range unit in combination with friction devices in the splitter unit or reverse unit will provide eight forward drive ratios or four reverse drive ratios.

It is an object of this invention to provide in an improved transmission a multi-ratio range unit each of which ratios may be combined with a splitter unit for forward drive ratios and with a reverse unit for reverse drive ratios.

It is a further object of this invention to provide a structure which permits assembly of a majority of the transmission components before they are installed in the housing, thus reducing alignment and assembly difficulties.

It is another object of this invention to provide pressurization for a rotating friction device and lubrication for a planetary gear set driven by the friction device via a shaft which rotates relative to the friction device.

Figure 1:
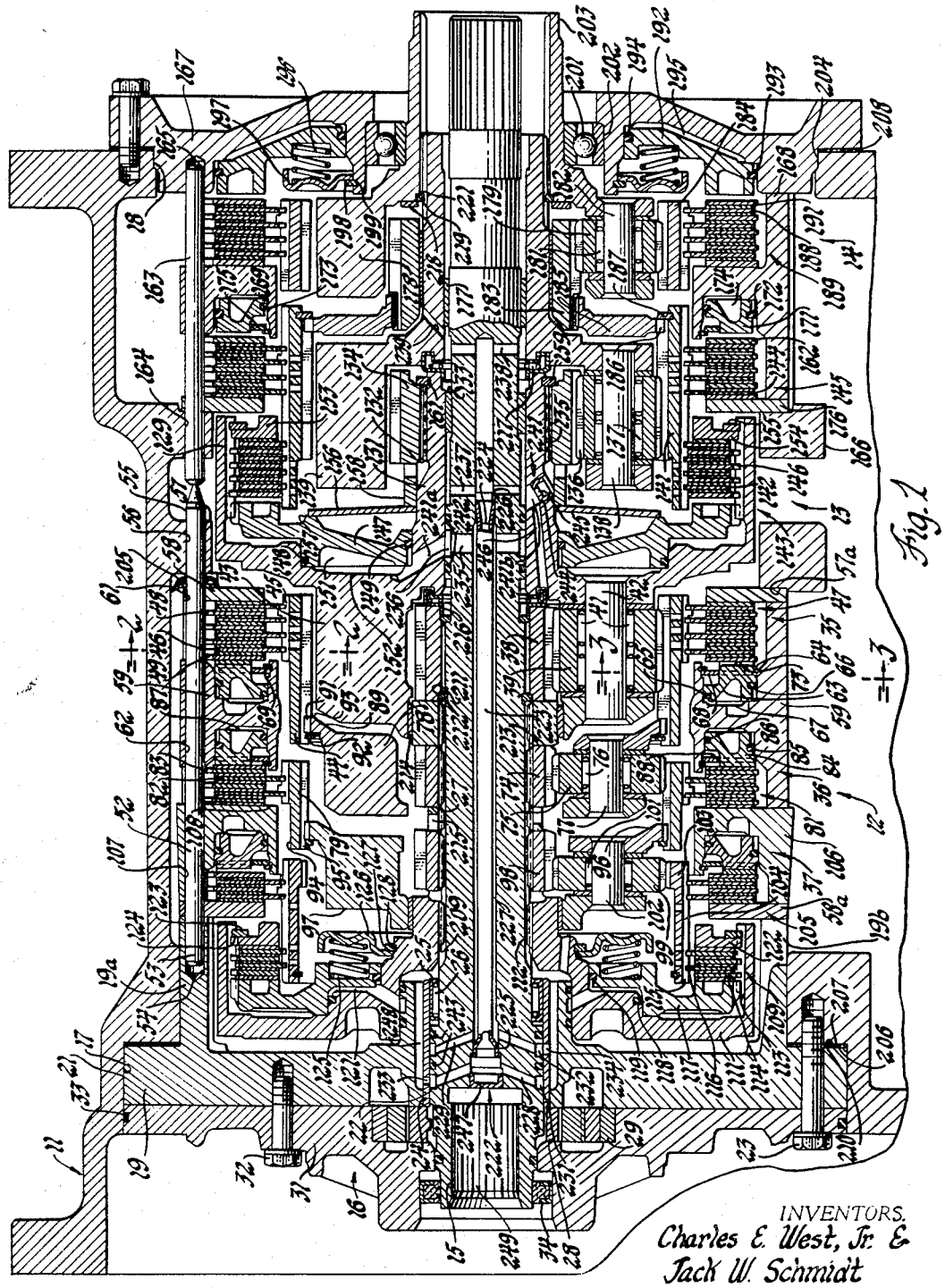
Figure 2:
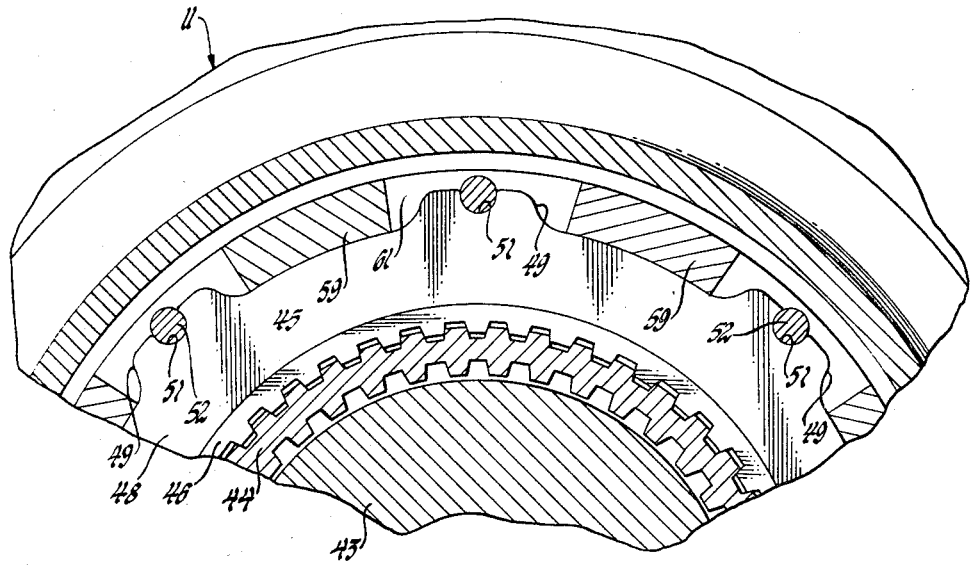
Figure 3:
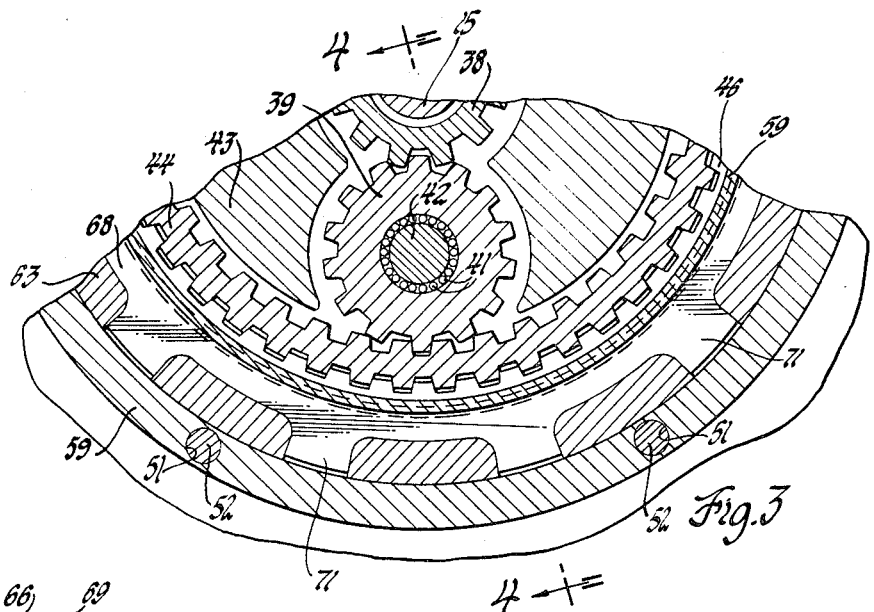
Figure 4:
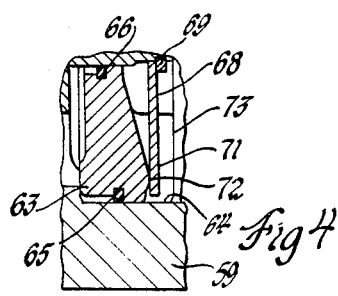

These and other objects and advantages will become more apparent from the following description of the preferred embodiment of the invention illustrated in the accompanying drawings in which:

FIGURE 1 is a sectional elevational view of a transmission constructed in accordance with the invention, FIGURE 2 is a section view taken along line 2—2 in FIGURE 1 showing a portion of a friction device and support, FIGURE 3 is a section view taken along line 3—3 in FIGURE 1 showing a portion of an actuator piston and return spring, FIGURE 4 is a section view taken along line 4—4 in FIGURE 3 showing another portion of the actuator piston and return spring.

Referring to the drawings, there is shown in FIGURE 1 a transmission consisting generally of a housing 11, a four-speed range unit 12, a two-speed splitter unit 13, a reverse unit 14, an input shaft 15, and a hydraulic pump assembly 16.

The housing 11 is open at both ends having axially aligned pilot diameters or peripheral locating surface 17 and 18 at its left and right ends respectively. A diaphragm member 19, generally annular in shape, has an outer diameter or peripheral surface 21, supported in the peripheral locating surface 17, and an inner diameter 22 which is concentric to the outer diameter 21. The diaphragm 19 is secured to the housing 11 with a plurality of fasteners 23 and has an annular drum portion 19a which extends inside housing 11. The drum portion 19a has a drain slot 19b which extends inside housing 11. The drum portion 19a has a drain slot 19b to prevent fluid from collecting in the drum portion. A sleeve member 24 is pressed into inner diameter 22 and supports a housing 25 of a roller bearing 26. The input shaft 15 is rotatably supported in the roller bearing 26 thereby making it concentric with the pilot diameter 17. A splined portion 27 of the input shaft 15 drivingly supports a plurality of sun gears which are components of the range unit 12.

The hydraulic pump assembly 16 is of the conventional internal-external gear type having a drive gear 28 driven by the input shaft 15 and a driven gear 29 rotatably supported by a pump housing 31. The pump housing 31 is secured to the diaphragm 19 by a plurality of fasteners 32 and carries a seal member 33 which prevents leakage of fluid from the transmission to atmosphere. A lip-type seal 34 prevents air and contaminates from entering the pump 16.

The range unit 12 includes a low ratio planetary set 35, a second ratio planetary set 36 and a third ratio planetary set 37. The low ratio planetary set 35 has a low ratio sun gear 38, driven by input shaft 15, meshing with a plurality of pinion gears 39, which are rotatably mounted, by roller bearings 41, on pins 42 that are secured in a low ratio carrier 43. Also meshing with the pinion gears 39 is a low ratio ring gear 44 having a splined outer diameter 45 adapted to be in operative connection with a plurality of friction plates 46 which are components of a low ratio friction drive establishing device such as a low ratio brake 47. Alternately spaced with the friction plates 46 are a plurality of reaction plates 48 which have a plurality of protuberances 49 on their outside diameter. The protuberances 49 have a central U shaped opening or slot 51 which partially surrounds pin members 52. One end 53 of the pin members 52 is pressed into a plurality of apertures 54 in diaphragm member 19. The apertures 54 are equally spaced on a bolt circle which is concentric to inner diameter 22. To permit the reaction plates 46 to be self-centering, a minimum of three pins must be used. The other ends 55 of the pin members 52 extends through a plurality of openings or bores 56 in an annular rib portion 57 of the housing 11.

The low ratio brake 47 also includes a backing plate 58 which abuts surface 57a of rib 57 and a piston housing 59; both of which have openings or bores 61 and 62 respectively, to permit them to be mounted on the pins 52. A piston 63, for actuating the brake 47, is slidably mounted in a recessed portion 64 of the piston housing 59. Two lip-type sliding seals 65 and 66 cooperate with the piston 63 and the recessed portion 64 to provide a leakproof chamber 67 so that the piston 63 may be actuated by hydraulic pressure. A Belleville spring 68 provides a return force for the piston 63 when the chamber 67 is not pressurized. The inner portion of the spring 68 is held in axial relationship with piston housing 59 by a snapring 69 so that axial movement of the piston 63 can be attained only by deflection of the outer portion of the spring 68. The outer portion of the spring 68 has a plurality of radially extending fingers 71 which bear against the piston 63 in recessed portions 72 below the apply surface 73 of the piston 63 so that the spring 68 will not contact the reaction plate 48. Thus, when the brake 47 is energized, the low ratio ring gear 44 is held from rotation.

The second ratio planetary set 36 has a second sun gear 74, driven by the input shaft 15, meshing with a plurality of pinion gears 75, which are rotatably mounted, by roller bearings 76, on pins 77 which are secured to a second ratio carrier 78. Also meshing with the pinion gears 75 is a second ratio ring gear 79 which is operatively connected to a second ratio friction drive establishing device, such as a brake 81. The second ratio brake 81 is similar in construction to low-ratio brake 47 and has friction plates 82 and reaction plates 83 alternately engaging second ratio ring gear 79 and pin members 52 respectively. The piston housing 59 cooperates with a second ratio piston 84 and seals 85 and 86 to form an energizing chamber 87. A Belleville spring 88 is provided to de-energize the brake 81. Thus when the second ratio brake 81 is engaged, the second ratio ring gear 79 is restrained from rotation.

The second ratio carrier 78 has a radially extending hub portion 89 which is drivingly connected by a spline 91 to the low ratio ring gear 44. A snapring 92 and a shoulder portion 93, of the low ratio ring gear 44, cooperate to prevent relative axial movement between the low ratio ring gear 44 and the second ratio carrier 78. The second ratio ring gear 79 has a circumferentially extended portion 94 having a splined inner diameter 95 drivingly connected to a radially extended hub 96 of a third ratio carrier 97 which is a component of the third ratio planetary set 37.

The third ratio planetary set further includes a third ratio sun gear 98 meshing with a plurality of pinion gears 99 which are rotatably mounted, by roller bearings 101, on pins 102, secured to the third ratio carrier 97. The pinion gears 99 also mesh with a third ratio ring gear 103 which is operatively connected, by a spline 104, to a third ratio friction drive establishing device such as a third ratio brake, 105. The third ratio brake 105 includes a piston housing 106 and a backing plate 58a each having a plurality of openings or bores 107 which radially locate the piston housing 106 on the pins 52. The backing plate 58a abuts the drum portion 19a of the diaphragm 19. The third ratio brake 105 is otherwise similar in construction to the low ratio brake 47, and prevents rotation of third ratio ring gear 103 when engaged. The piston housing 106 has a flat annular surface 108 which serves as a backing plate for the second ratio brake 81.

A fourth or direct drive ratio is provided in the range unit 12 by coupling the third ratio ring gear 103 to the input shaft 15 with a direct friction drive establishing device, such as a direct clutch, 109. The direct clutch 109 has a drum 111 which is drivingly connected by splines 112 and 113, to the input shaft 15 and a plurality of externally splined friction plates 114 respectively. Alternately spaced with the externally splined friction plates 114 and drivingly connected to the third ratio ring gear 103, by splines 115, are a plurality of internally splined clutch plates 116. A piston 117 is carried by the drum 111 and is axially movable relative thereto. Seal members 118 and 119 cooperate with the drum 111 and piston 117 to form an energizing chamber 121. When hydraulic fluid, under pressure, is admitted to the chamber 121, the piston 117 is forced into engagement with the friction plates 114 and 116 thereby moving them into contact with a backing plate 122 to establish a friction drive between the third ratio ring gear 103 and the third ratio sun gear 98 via the input shaft 15. Thus a lock-up or one-to-one drive ratio is established in the third ratio planetary gear set 37. The backing plate 122 is restrained from axial movement, relative to the drum 111, by a snapring 123 and a shoulder portion 124 of the drum 111. To effect disengagement of the direct clutch 109, a plurality of return springs 125 are provided. The return springs 125 are held in compression between the piston 117 and a spring retainer 126 which is held from moving axially, away from the piston 117, by a snapring 127 and a groove 128 in the drum 111. It is apparent, due to the interconnections between the planetary gear sets of the range unit, that when the third ratio planetary gear set is in a lock-up condition, the remaining planetary gear sets of the range unit 12 are also locked up.

The low ratio carrier 43 has two hollow cylindrical portions 129 and 131 extending axially from the outside and inside diameters thereof respectively. The cylindrical portion 131 has a spline 132 formed on the outside diameter thereof and is radially supported on the input shaft 15 by a journal bearing 133. A splitter sun gear 134 is drivingly connected, by a spline 135, to the cylindrical portion 131, and is an element of the splitter unit 13. A plurality of pinion gears 136 mesh with the splitter sun gear 134 and are rotatably mounted by roller bearings 137, on pins 138 which are secured to the splitter carrier 139. Also meshing with the pinion gear 136 is a splitter ring gear 141 which has a spline on its outside diameter so that it is operatively connected to a plurality of internally splined friction plates 142 which are components of a splitter high friction drive ratio establishing device, such as a lockup clutch, 143 and a plurality of friction plates 144 which are components of a splitter low friction drive ratio establishing device, such as a splitter low brake 145. Alternately spaced with the friction plates 142 are a plurality of externally splined friction plates 146 which are operatively connected, by splines, to the cylindrical portion 129 of the low ratio carrier 43. A piston 147 is slidably mounted on the cylindrical portion 131 and is operatively connected, by splines, to the cylindrical portion 129 of the low ratio carrier 43. Two seals 148 and 149, carried by the piston form a leakproof expansible chamber 151 between the piston 147, the cylindrical portion 131, and an annular surface 152 on the low ratio carrier 43. The piston 147 is moved into engagement with the friction plates 142 and 146, when fluid under pressure is admitted into the chamber 151. Axial movement of the friction plates 142 and 146 is limited by a backing plate 153 which is operatively connected, by splines, to cylindrical portion 129 and held in axial relationship therewith by a shoulder 154 and a snapring 155. A Belleville spring 156 provides a disengaging force for the piston when the chamber 151 is not pressurized. The outer left edge of the spring 156 contacts an annular protuberance 157 on the piston 147 while the inner right edge of the spring 156 contacts an annular extension 158 of sun gear 134. A snapring 159, held in a groove 161 in cylindrical extension 131, abuts the right side of sun gear 134, to prevent movement of the sun gear 134 axially to the right, thereby providing a reaction member for the spring 156. Thus, when the splitter high clutch 143 is engaged, the sun gear 134 and splitter ring gear 141 are both operatively connected to the low ratio carrier 43.

Alternately spaced with the friction plates 144 are a plurality of reaction plates 162 which are similar in construction to reaction plates 48. The reaction plates 162 are restrained from rotating by a plurality of pins 163 which engage U shaped openings or slots on the periphery of the reaction plates 162. The pins 163 are aligned in a plurality of openings or bores 164 and 165 in an annular rib 166 of the housing 11 and a rear diaphragm 167, respectively. Axial movement of the pins 163 is limited by the end of pin members 52 and the bottom of aperture 165 in the rear diaphragm 167. A piston housing 168, having an annular recess 169, is also supported radially by the pins 163. A splitter low piston 171, having two seal members 172 and 173, is supported in the annular recess 169 and cooperates with the piston housing 168 to form an expansible chamber 174. The splitter low piston 171, similar in construction to piston 63, is urged into engagement with the friction plates 144 and the reaction plates 162 of the splitter low brake 145 and out of of engagement therewith by a Belleville spring 175, which is similar in construction to Belleville spring 68. A backing plate 176, similar in construction to backing plate 58, abuts the annular rib 166 thereby limiting the axial movement of the piston 171, the friction plates 144 and the reaction plates 162. When the splitter low brake is engaged, the splitter ring gear 141 is restrained from rotation.

The splitter carrier 139 has a hollow cylindrical portion, extending to the right, rotatably supported on the input shaft 15 by a journal bearing 177. A spline formed on the cylindrical portion drivingly connects the splitter carrier 139 with the reverse carrier 178 of the reverse planetary set 14. The reverse planetary set also includes a plurality of pinions 179, which are rotatably mounted by roller bearing 181 on pins 182 secured to the reverse carrier 178, meshing with a reverse sun gear 183 and a reverse ring gear 184. The reverse sun gear 183 is radially supported by a hub 185 which is in splined engagement with the splitter ring gear 141 and the reverse sun gear 183. The hub is restrained axially by a shoulder 186 on splitter ring gear 141 and a snapring 187. The reverse ring gear 184 has a spline on its outside diameter so that it is operatively connected to a plurality of friction plates 188 which are components of a reverse ratio friction drive establishing device, such as a reverse brake, 189. Alternately spaced with the friction plates are a plurality of reaction plates 191, similar in construction to reaction plate 48. The reaction plates 191 are held from rotation by U shaped opening or slot on their periphery which engage the pins 163. A piston 192 is provided to engage the erverse brake 189 and thereby prevent rotation of the reverse ring gear 184. The piston has two seal members 193 and 194 and is slidably supported in the rear diaphragm 167 with which it cooperates to form an expansible chamber 195. A plurality of coil springs 196 are held in compression between the piston 192 and a spring retainer 197 to prevent the piston from engaging the friction plates 188 and the reaction plates 191 when the reverse brake 189 is disengaged. The spring retainer 197 is prevented from moving axially by the spring force and a snapring 198 which is held in a groove 199 in the rear diaphragm 167. The reverse carrier 178 has a hollow cylindrical extension, rotatably supported by a ball bearing 201 in a base 202 of the rear diaphragm 167, which extends beyond the rear diaphragm 167 to provide an output member 203 for the transmission.

The rear diaphragm 167 is piloted in pilot diameter 18 of the housing 11 by a diameter 204 which is concentric to bore 202 thereby providing concentricity between the pilot diameter 18 and the output member 203 of the transmission. Since the input shaft 15 is concentric with pilot diameters 17 and 18 it is also concentric with the output member 203 of the transmission.

The components of the transmission are designed so that the pump assembly 16, the diaphragm 19, the input shaft 15, and the range unit 12, can be assembled outside of the housing 11 and then be installed in the housing, from the left end thereof, thereby substantially reducing assembly difficulties. The remaining components of the transmission, such as the splitter gear unit lock-up clutch 143, sun gear 134, carrier 139, splitter ring gear 141, the reverse unit 14, and the rear diaphragm 167 are then installed individually from the right end of the housing 11. A plurality of spring clips 205 on the pins 52, hold the brake units 47, 81 and 105 in location on the pins 52 during assembly. Production tolerances, existing on the pressure plates 58 and the piston housings 59 and 106, are accommodated by placing one or more gaskets 206 between an axial locating surface 210 on the diaphragm 19 and an abutment portion 207 of the housing 11. Similar accommodation is made at the right end of the transmission by placing gaskets 208 between the rear diaphragm 167 and the housing.

The components of the range unit are axially located on the input shaft 15 by a shoulder portion 209 of the input shaft which abuts the drum 111 and a snapring 211, secured in a groove 212 in the input shaft 15, which abuts a journal 213. The journal 213 also serves as a rotary support for the low ratio carrier 43 through a bearing 214 and provides proper spacing between the low ratio and second ratio sun gears 38 and 74. A spacer 215, splined to the input shaft 15, provides proper spacing between the second ratio and third ratio sun gears 74 and 98. The third ratio sun gear 98 abuts the drum 111. The low ratio sun gear 38 is held between the journal 213 and a roller thrust bearing 216 which abuts the low ratio carrier 43. A thrust bearing 217 provides axial support, while permitting relation rotation, between the low ratio carrier 43 and the splitter carrier 139. A washer 218, held against a shoulder 219 of the splitter carrier 139 by a snapring 221, abuts the reverse carrier 178 thereby maintaining axial relationship between these carriers. The reverse carrier 178 is held in axial relationship with the rear diaphragm 167 by the ball bearing 201, thereby causing the axial relationship between all of the components of the transmission, which are directly driven by or rotatably supported by the input shaft 15, and the housing 11 to be maintained.

The input shaft 15 has a step-drilled hole 222 into which is pressed a tube 223. The tube has a central passageway 224 and expanded end portions 225 and 226 which contact the step-drilled hole 222 and provide an annular passageway 227 between the tube 223 and the step-drilled hole 222. A plurality of oblique passageways 228 and 229 provide fluid connections between grooves 231 and 232, in the input shaft 15, and passageways 224 and 227 respectively. The oblique passageways 228 are in fluid connection, via aperture 233 in sleeve 24, with a source of lubrication fluid; while the oblique passageways 229 are in fluid communication, via aperture 234 in sleeve 24, with a source of high pressure fluid. A cross-drilled hole 235 provides a fluid connection between the annular passageway 227 and a groove 236 in the input shaft; while cross-drilled holes 237 and 238 provide fluid connection between the central passageway 224 and the outside diameter of the shaft 15. Lubrication fluid is admitted to the reverse unit 14 and thrust bearing 217 via cross-drill holes 238 and a plurality of angle drilled holes 239 in the splitter carrier 139.

The low ratio carrier 43 has a dual-purpose hole 241, drilled obliquely to its central axis of rotation, which passes through the cylindrical portion 131, and an open central portion of the low ratio carrier 43 into the chamber 151. The location of the low ratio carrier on the input shaft effectively separates the dual-purpose hole into a splitter high engage passage 241a and a lube passage 241b. The splitter high engage passage 241a is aligned with the groove 236 and is therefore in communication with the annular passageway 227. Sealrings 242 and 243 prevent leakage of high pressure fluid from grooves 236 and 232, respectively, during engagement of the splitter high clutch.

Lube passage 241b, aligned with cross-drilled hole 237, admits lubrication fluid from the central passage 224 to the splitter unit. An orifice plug 244, having a restriction passage 245, is pressed into the lube passage 241b to control the amount of lubrication flow to the splitter unit. To provide lubrication for the thrust bearing 216, a passageway 246 is drilled into the low ratio carrier 43 intersecting the lube passage 241b upstream of the orifice plug 244. To prevent leakage of lubrication fluid from the left end of the step-drilled hole 222, a plug 247 is pressed into the end of the step-drilled hole. To admit lubrication fluid to the range unit 12, a recessed portion 248 provides fluid communication between aperture 233 and the range unit.

During the following description of operation for the gearing, only the friction ratio establishing devices which are energized will be specifically mentioned; therefore, any device not specifically mentioned is considered to be de-energized for the particular ratio being described.

The range unit 12 provides four-speed ratios between the input shaft 15 and the low ratio carrier 43, which is the output member of the range unit. Input speed and torque is supplied to the transmission by any suitable power source, such as an internal combustion engine, via a spline connection 249, to the input shaft 15.

To establish first or low gear ratio in the range unit, low ratio brake 47 is actuated, thus preventing rotation of low ratio ring gear 44. The low ratio sun gear 38, rotated by the input shaft 15, causes the pinions 39, with which it meshes, to "walk around" the inside of the stationary ring gear 44 thereby rotating the low ratio carrier 43 in the same direction as the input shaft 15, but at a reduced speed. To establish second gear ratio in the range unit, the second ratio brake 81 is energized thus preventing rotation of the second ratio ring gear 79. When the second ratio sun gear 74 is driven by the input shaft 15, the second ratio carrier 78, due to the planetary action of the pinions 75, is rotated in the same direction as the input shaft but at a reduced speed. The low ratio ring gear 44, due to the spline connection 91, is rotated by the second ratio carrier 78. Since the low ratio ring gear 44 is rotating in the same direction as the low ratio sun gear 38, the low ratio carrier 43 is driven more rapidly, in the second ratio, for a given input speed. To establish the third ratio in the range unit, the third ratio brake 105 is energized thereby preventing rotation of the third ratio ring gear 103. Thus, when the input shaft 15 drives the third ratio sun gear 98, the planetary action of pinions 99 cause the third ratio carrier 97 to rotate in the same direction as the third ratio sun gear 98 but at a reduced speed. The third ratio carrier 97 drives the second ratio ring gear 79, thereby causing the second ratio carrier 78 to rotate faster in third ratio than in second ratio, which produces an increase in speed of the low ratio ring gear 44 and carrier 43. To establish fourth gear ratio, in the range unit 12, the direct clutch 109 is energized thereby "locking-up" the range unit 12 to produce a one-to-one drive ratio between the input shaft 15 and the low ratio carrier 43.

The splitter unit 13 will produce two speed ratios between the low ratio carrier 43, which is the input member of the splitter unit 13, and the output member 203 which is driven by the splitter carrier 139. One of the ratios, less than one-to-one, is established by energizing splitter low brake 145 thereby preventing rotation of splitter ring gear 141. Thus when the splitter sun gear 134 is driven by the low ratio carrier 43, of the range unit 12, the splitter carrier 139 will be driven in the same direction, due to the planetary action, as the splitter sun gear 134 but at a reduced speed.

The second ratio of the splitter unit 13, a one-to-one drive, is established by energizing the lock-up clutch 143 thereby "locking-up" the splitter unit 13 to produce a one-to-one drive from the low ratio carrier 43 to the output member 203.

The reverse unit 14 is operative to produce a reversing ratio between the low ratio carrier 43 and the output member 203. The reverse ratio is established by energizing the reverse brake 189, thereby preventing rotation of the reverse ring gear 184. Thus, when the low ratio carrier 43 and the splitter sun gear 134 are rotated forwardly, the splitter ring gear 141 will be driven reversely. The splitter carrier 139, due to the load on the output member 203, will remain stationary until the output member 203 is driven. The splitter ring gear 141 drives the reverse sun gear 183, in a direction opposite to the low ratio carrier 43, which, due to the planetary action of the pinion 179, in turn drives the reverse carrier 178 and the output member 203, secured thereto.

From the foregoing description, it is evident that any of the four ratios of the range unit may be combined with either of the splitter unit ratios to provide eight forward speed ratios or with the reverse ratio to provide four reverse ratios. The following list has been prepared, by way of example, to indicate a range of speed ratios available in a transmission employing the gearing described above:

| Drive range | Range unit friction drive device | Range Unit | Splitter Unit friction drive device | Splitter or unit | Reverse | Total ratio |
|---|---|---|---|---|---|---|
| F-1 | 47 | 1st | 145 | Lo | | 1st. |
| F-2 | 81 | 2nd | 145 | Lo | | 2nd. |
| F-3 | 105 | 3rd | 145 | Lo | | 3rd. |
| F-4 | 47 | 1st | 143 | Hi | | 4th. |
| F-5 | 109 | 4th | 145 | Lo | | 5th. |
| F-6 | 81 | 2nd | 143 | Hi | | 6th. |
| F-7 | 105 | 3rd | 143 | Hi | | 7th. |
| F-8 | 109 | 4th | 143 | Hi | | 8th. |
| R-1 | 47 | 1st | | | R | 1st. |
| R-2 | 81 | 2nd | | | R | 2nd. |
| R-3 | 105 | 3rd | | | R | 3rd. |
| R-4 | 109 | 4th | | | R | 4th. |

Many modifications and variations are possible in light of the above teachings. It is, therefore, to be understood, that within the scope of the appended claims, the inventions may be practiced otherwise than as specifically described.

What is claimed is:

1. In a transmission having housing means; an input shaft and an output member rotatably supported in axial alignment in said housing means; a range unit having first, second, and third planetary sets including, a sun gear in each of the planetary sets drivingly connected with said input shaft, a ring gear in each of the planetary sets, brake means for selectively operatively connecting said housing means and each of said ring gears, a carrier member in each of the planetary sets having a plurality of pinion gears rotatably supported thereon meshing with said sun and ring gears, said carrier member of said third planetary set drive connected to said ring gear of said second planetary set, said carrier member of said second planetary set drive connected to said ring gear of said first planetary set, and said carrier member of said first planetary set providing an output element for said range unit, and clutch means for selectively operatively connecting said sun and ring gears of said third planetary set thereby providing a one-to-one drive ratio in said range unit; a splitter unit having fourth planetary set including, a sun gear drivingly connected to said carrier member of said first planetary set, a ring gear, brake means for selectively operatively connecting said ring gear to said housing means, a carrier member having a plurality of pinions rotatably mounted thereon and meshing said sun and ring gear, said carrier being drive connected to said output member, and lock-up clutch means for selectively operatively connecting said ring gear of said fourth planetary set and said carrier of said first planetary set thereby providing a one-to-one drive ratio in said splitter unit; a source of fluid under pressure; and lubrication and pressurizing fluid systems for said splitter unit and said lock-up clutch respectively, said systems including concentric passage means in said input shaft and first and second passage means in said carrier of said first planetary set whereby said lubrication and said pressurizing fluid are maintained separately.

2. The invention defined in claim 1 and said housing means including a casing; an end cover, secured to said casing, having a plurality of circumferentially spaced axially extending closed apertures; and an annular rib member, secured to said casing and being axially spaced of said end cover, having a plurality of openings axially aligned with said closed apertures; and said brake means including a plurality of pin means extending between said closed apertures and openings; a plurality of alternately spaced friction plate members and reaction plate members drivingly connected to said ring gears and said pin means respectively; and engaging means including a piston housing having openings aligned on said pin means and a recessed portion, piston means carried by said recessed portion, means for admitting fluid from said source to said recessed portion so that the piston means is urged into contact with at least one of said plate members and spring means to urge said piston means out of contact with said plate member.

3. In a transmission having a housing; an input shaft rotatably mounted in said housing and having first and second concentric passage means therein and first and second axially spaced cross passages respectively communicating said first and second concentric passage means with the outside diameter of said shaft at spaced intervals; an output member rotatably supported by said housing and said input shaft; a plurality of planetary gear sets selectively operatively connecting said input shaft and said output member to provide a plurality of drive ratios therebetween, and at least one of said planetary gear sets having a selectively operable lock-up clutch with an actuator piston to provide a one-to-one drive ratio in said one planetary gear set; a carrier member, in another of said planetary gear sets, having a recessed portion cooperating with said actuator piston to form a fluid chamber and further including; a central aperture to permit said carrier to be rotatably supported on said input shaft, an aperture oblique to and intersecting said central aperture at two locations spaced along the outer periphery of said central aperture so that a first portion of said oblique aperture, radially aligned with said first cross passage, communicates said central aperture with said recessed portion and a second portion of said oblique aperture, radially aligned with said second cross passage, communicates said central aperture with said one planetary gear set, and restriction means in said second portion of the oblique aperture; and a source of fluid operable to selectively supply pressurizing fluid to said first concentric passage whereby said lock-up clutch will be operated, and to supply lubrication fluid to said second concentric passage means whereby said one planetary gear set will be lubricated.

4. In a transmission having housing means including a tubular casing having two open ends, an end cover for each of said open ends having a plurality of circumferentially spaced axially extending closed apertures, a pair of annular rib members, secured to said casing between the open ends thereof, a plurality of openings through said rib members axially aligned with said closed apertures; an input shaft rotatably mounted in said housing means and having first and second concentric passage means therein and first and second cross passages communicating said first and second concentric passage means with the outside diameter of said shaft at spaced intervals; an output member rotatably supported by said housing means and said input shaft; a plurality of planetary gear means having input elements, output elements and reaction elements operatively connecting said input shaft and said output member, at least one of said planetary gear means having a selectively operable clutch with an actuator piston operable to connect the input element and reaction element of said one planetary gear means so that a one-to-one drive ratio is established in said one planetary gear means, and brake means including a plurality of pin members extending between the closed aperture of one of said end covers and the openings of one of said rib members, a plurality of friction plates and reaction plates alternately engaging said pin members, and said reaction members, and apply means for urging said friction plates and reaction plates into contact, selectively operable to operatively connect said housing and said reaction elements to establish a plurality of drive ratios in said planetary gear means between said input shaft and said output member; a carrier member, in another of said planetary gear means, having a recessed portion cooperating with said actuator piston to form a fluid chamber and further including; a central aperture to permit said carrier to be rotatably supported on said input shaft, an aperture oblique to and intersecting said central aperture at two locations spaced along the outer periphery of said central aperture so that a first portion of said oblique aperture, radially aligned with said first cross passage, communicates said central aperture with said recessed portion and a second portion of said oblique aperture, radially aligned with said second cross passage, communicates said central aperture with said one planetary gear set, and restriction means in said second portion of the oblique aperture; and a source of fluid operable to selectively supply pressurizing fluid to said first concentric passage whereby said lock-up clutch will be operated, and to supply lubrication fluid to said second concentric passage means whereby said one planetary gear set will be lubricated.

5. In a transmission having housing means; input means and output means rotatably supported by said housing means; a first planetary gear means including a first input element drivingly connected to said input means, a first reaction element, first brake means including a piston housing for selectively operatively connecting said reaction element to said housinig means, and planetary output means including a planetary carrier member having a hub with an outer portion extending axially from the hub, an inner portion concentric with said outer portion extending axially from the same side of said hub as the outer portion, and a chamber in said hub between said inner and outer portions on the same side of the hub as the inner and outer portions; a second planetary gear means including a second input element drivingly connected to one of said inner and outer portions of said hub, a second output element drivingly connected to said output means, another element, second brake means selectively operatively connecting said another element and said housing means, and clutch means selectively operatively connecting said another element to the other of said inner and outer portions, including apply piston means slidably disposed in said chamber; and fluid control means operable to provide selective operation of said clutch means and said brake means whereby said brake means of said first planetary gear means and said brake means and clutch means of the second planetary gear means are selectively operable to provide a plurality of drive ratios between said input means and said output means.

6. The invention defined in claim 5 and said planetary output means further including pinion shafts fixed to one side of said hub and having pinions thereon meshing with said first input element and first reaction element, said chamber being located in the other side of said hub and said inner and outer portions of said hub including drum means extending from said other side of said hub externally and internally of said second input element and said second clutch means.

7. The invention defined in claim 5 and said brake means of said first planetary gear means comprising a plurality of friction discs operatively connected to said first reaction element; pin means secured to said housing means; a plurality of reaction discs, alternately spaced with said friction discs, operatively connected to and axially slidable on said pin means; a piston housing having opening means surrounding said pin means, a drum portion enclosing said reaction discs between said pin means, and a piston chamber; apply piston means slidably disposed in said piston chamber selectively movable into contact with one of said friction and reaction discs to urge said friction discs and said reaction discs into contact with each other thereby preventing relative rotation between said friction and reaction discs; and return spring means operable on said apply piston means to move said apply piston means out of contact with said one friction and reaction disc thereby permitting relative rotation between said friction and reaction discs.

8. The invention defined in claim 5 and said transmission further comprising a third planetary gear means having a third input element drivingly connected to said input means; a third output element drivingly connected to said reaction element of said first planetary gear means; a third reaction element; third brake means for selectively operatively connecting said reaction element to said housing means including a plurality of friction discs drivingly connected to said third reaction member, a plurality of reaction discs, alternately spaced with said friction discs, drivingly connected to said pin means, an apply piston slidably mounted in said piston housing of said first planetary gear means, movable into contact with one of said friction and reaction discs to urge said friction and reaction discs into contact with each other thereby preventing relative rotation between said friction and reaction discs, and return spring means operable on said apply piston to move said apply piston out of contact with said one friction and reaction disc, thereby permitting relative rotation between said friction and reaction discs whereby said brake means of the third planetary gear means and said brake means and clutch means of the second planetary gear means are selectively operable to provide a plurality of drive ratios between the input means and the output means.

9. The invention defined in claim 5 and said input means comprising an input shaft having an outside diameter, first and second concentric axial passages in said input shaft, and first and second radial passages communicating said first and second axial passages with said outside diameter respectively at spaced intervals; said carrier member of said planetary output means having a central bore surrounding a portion of said input shaft adjacent said first and second radial passages, and an oblique passage in said inner drum intersecting said central bore at first and second positions radially aligned with said first and second radial passages respectively so that a first portion of said oblique passage communicates said first axial passage with said chamber in said hub and a second portion of said oblique passage communicates with the outside of said inner drum; and fluid source means selectively communicating pressure fluid to said first axial passage whereby said clutch means of second planetary gear means may be actuated, and communicating lubrication fluid to said second axial passage whereby said second planetary gear means will be lubricated.

10. The invention defined in claim 5 and further including a reverse planetary gear means having a reverse input member drivingly connected to said another member of said second planetary gear means; a reverse reaction member; reverse brake means including a reverse apply piston slidably mounted in said housing means for selectively operatively connecting said reaction member and the housing means; and an output member secured to said output means; whereby selective operation of said reverse brake means provides a reverse drive ratio between said planetary output means and said output means.

11. The invention defined in claim 10 and said brake means of said second planetary gear means including a plurality of friction discs drivingly connected to said reaction member of said second planetary gear means; axially extending pin means carried by said housing means; a plurality of reaction discs, alternately spaced of said friction discs drivingly connected to said pin means; piston housing means carried by said pin means having a piston chamber; an apply piston slidably disposed in said piston chamber selectively movable into contact with one of said reaction and friction discs to urge said reaction and friction discs into contact with each other thereby preventing relative rotation between said reaction and friction discs; and return spring means operable on said apply piston to move the apply piston out of contact with said one reaction and friction discs thereby permitting relative rotation between said reaction and friction discs; and said reverse brake means further including a plurality of friction discs drivingly connected to said reverse reaction member; a plurality of reaction discs alternately spaced of said friction discs drivingly connected to said pin means; and return spring means for said reverse apply piston; whereby said piston is movable into and out of contact with one of said friction and reaction discs to prevent and permit, respectively, relative rotation between said friction and reaction discs.

12. In a transmission assembly, a transmission housing having a reaction portion, planetary gear means including a sun gear element, a ring gear element and a carrier element having pinions meshing with said sun and ring gear elements; driving means connected to drive one of said elements; driven means connected to be driven by another of said elements; the third element being a reaction element; a plurality of spaced annular friction plate elements operatively connected to one of said elements; a plurality of intermediate annular friction plate members located between said spaced plates connected to another element; an annular backing plate member located at one end of said friction plates; an annular cylinder member located at the other end of said friction plates closely surrounding said ring gear element and having a radially outer cylindrical wall, a radially inner cylindrical wall and a fulcrum portion on one of said walls; an annular piston having a radially outer portion in sealing engagement with said outer wall and a radially inner portion in sealing engagement with said inner wall forming a fluid operated expansible chamber for moving said piston, said piston having a plurality of spaced pads extending axially from one portion of said outer and inner portions forming an intermittent annular surface in said one portion engaging said spaced and intermediate friction plates to engage and disengage said friction plates and having load bearing recesses between said pads spaced from the other portion of said inner and outer portions; and an annular spring having an annular part located at said fulcrum portion between one of said cylindrical walls and said pads and pivoted to said one cylindrical wall and having integral fingers extending into and engaging said load bearing recesses to retract said piston.

13. The invention defined in claim 12 wherein the spaced annular friction plate elements are operatively connected to said third element and the intermediate annular friction plate members are connected to said reaction portion of said transmission housing so that when said spaced and intermediate friction plates are engaged, the third element is held from rotation to provide a reaction element for said planetary gear means.

14. A unitary transmission subassembly for insertion into a transmission housing; planetary gear means including a sun gear element, a ring gear element and a carrier element having pinions meshing with said sun and ring gear elements; driving means connected to drive one of said elements; driven means connected to be driven by another of said elements; the third element being a reaction element; a plurality of spaced annular friction plate elements operatively connected to said reaction element; a series of members including a plurality of intermediate annular friction plate members located between said spaced plates, an annular backing plate member located at one end of said friction plates and an annular cylinder member located at the other end of said friction plates and having fluid operated expansible chamber means engaging said spaced and intermediate friction plates to engage and disengage said friction plates; a transverse support rotataby supporting said driving means and having a peripheral locating surface adapted to fit within the transmission housing, said transverse support axially engaging and locating one of said members and having axially engaging and locating one of said members and having axial locating surfaces adapted to axially locate said subassembly in the transmission housing; and subassembly holding and locating means including a plurality of circumferentially spaced sets of axially aligned openings in the outer peripheral zone of each of said members, a plurality of pins secured in said transverse support extending through said aligned openings and having portions extending beyond said members for support on the transmission housing, and spring clip means on at least some of said pins to hold said elements and members together in a unitary transmission subassembly on said pins between said spring clip means and said transverse support for insertion into the transmission housing to fix said members against rotation and to coaxially locate said members with respect to each other and said planetary gear means.

15. In a method of assembling a planetary transmission; the steps of starting the main subassembly with an end support plate having bearings, inserting a main shaft; assembling on said main shaft sun gearing, putting the carrier and pinion assemblies on said sun gears, placing a ring gear on said pinions, placing a piston and cylinder member subassembly around said ring gear, a brake plate subassembly with spaced plates splined on said ring gear and intermediate plate members securing pins to said end support plate which extend through openings in said members of said cylinder and plate subassemblies, placing fastening means on said pins to hold said main subassembly together; inserting said main subassembly into a transmission houing with said pins engaging openings to prevent rotation of said members and said end support plate in said housing with axial and radial locating engagement and holding said members against an abutment on said housing and then assembling other gearing in the transmission housing from the other end and placing another end plate on said other end.

16. A method of assembling a transmission having a housing with a removable end cover, and an input shaft comprising the steps of: pressing pins into a plurality of circumferentially spaced axial apertures in said end cover; insert said input shaft, having a first clutch assembly and a first sun gear splined thereto, into a central aperture in said end cover; install a first brake means, comprising a housing with a plurality of circumferentially spaced axial apertures and a plurality of friction discs with a first ring gear splined thereto, on said pins; install a second brake means, comprising a housing with a plurality of circumferentially spaced axial apertures and a plurality of friction discs with a second ring gear splined thereto, on said pins; journal a first carrier means, having a plurality of pinions to mesh with said first sun and first ring gears, on said clutch assembly; install a first spacer on said input shaft abutting said first sun gear; install a second sun gear on said input shaft abutting said first spacer; install a plurality of reaction discs, having a plurality of circumferentially spaced axially aligned slots at their outer periphery, and friction discs, having a splined inner diameter with a third ring gear splined thereto, on said pins; install a backing plate, having a plurality of circumferentially spaced axial apertures, on said pins adjacent one of said friction and reaction discs and abutting said housing of said second brake means; install a second carrier means, having a plurality of pinions to mesh with said second sun and second ring gears and a toothed outer hub portion, in said third ring gear; install a second spacer on said input shaft abutting said second sun gear; install a snapring on said input shaft abutting said second spacer; press spring clip means on said pins abutting said backing plate to maintain axial alignment of the first and second brake means with said end cover thereby completing a range unit subassembly; install said range unit subassembly in said housing; and fasten said end cover to said housing with a plurality of fasteners.

17. In a transmission; housing means; input drive means and output drive means rotatably supported by said housing means; first planetary gear means having first planetary pinions and first and second concentric gear elements connecting with said pinions; first reaction brake means connected to said first concentric gear elements to establish a drive; first clutch means operatively connected to said first planetary gear means to establish a direct drive; said second concentric gears being connected to one of said drive means; second planetary gear means having second planet pinions and first and second concentric gear members connecting with said pinions located coaxially with said first planetary gear means; a planetary carrier having a central hub member located coaxially between said first and second planetary gear means, having a carrier shaft member extending axially in one direction from one side of said central hub portion for rotatably supporting said first planetary pinions, having an inner drum and an outer drum extending in the opposite direction from the opposite side of said central hub member and motor means on said central hub member between said drums; one of said drums being drivingly connected to said first concentric gear member, second clutch means operatively connected between the other of said drums and said second concentric gear member and actuated by said motor means for establishing and disestablishing a drive between said other drum and said second concentric gear member for establishing one drive in said second planetary gear means; second reaction brake means operatively connected to said second concentric gear member for establishing another drive in said second planetary gear means and a second carrier rotatably supporting said second planetary pinions and connected to the other drive means.

18. In a transmission; housing means; input drive means and output drive means rotatably supported by said housing means; first planetary gear means having first planetary pinions and first sun and ring gears connecting with said pinions; first reaction brake means connected to said first ring gears to establish a drive; first clutch means operatively connected to said first planetary gear means to establish a direct drive; said first sun gears being connected to one of said drive means; second planetary gear means having second planet pinions and second sun and ring gears connecting with said second planet pinions located coaxially with said first planetary gear means; a planetary carrier having a central hub member located coaxially between said first and second planetary gear means, having a carrier shaft member extending axially in one direction from one side of said central hub portion for rotatably supporting said first planetary pinions, having an inner drum and an outer drum extending in the opposite direction from the opposite side of said central hub member and motor means on said central hub member between said drums; one of said drums being drivingly connected to said second sun gear, second clutch means operatively connected between the other of said drums and said second ring gear and actuated by said motor means for establishing and disestablishing a drive between said other drum and said second ring gear for establishing one drive in said second planetary gear means; second reaction brake means operatively connected to said second ring gear for establishing another drive in said second planetary gear means and a second carrier rotatably supporting said second planetary pinions and connected to the other drive means.

19. A transmission assembly for mounting in a tubular transmission housing having an open end with axial and radial circumferential locating surfaces, an axial abutment and circumferential locating abutments for a plurality of rods both located longitudinally centrally on the inner surface; said assembly comprising the combination of a housing end closure plate adapted for closing an open end of a transmission housing and having an axial pilot surface on one side face and a radial pilot surface adapted to locate said closure plate in said transmission housing, a circumferentially extending axial abutment surface located adjacent and within said pilot surfaces, and a central bearing; a shaft rotatably mounted in said central bearing; planetary gear means including a sun gear, a ring gear and planetary pinions meshing with said sun and ring gears and mounted on a carrier, rotatably mounted and axially located on said shaft entirely on one side adjacent said one face of said cover plate; a plurality of rods fixed to said cover plate and extending on said one side parallel to and circumferentially spaced about said shaft externally of said gear means; fluid actuated reaction means having a circumferentially extending axial locating surface at one end engaging said circumferentially extending axial abutment surface and a circumferentially extending axial locating surface at the opposite end adapted for engaging said axial abutment in a transmission housing and non-rotatably fixed to and axially slidable on said rods and one of said gears for retarding said one gear including, an annular backing member, an annular fluid motor having a piston, a cylinder and means for axially locating said fluid motor relative to said backing member, a plurality of annular friction plates located between said backing member and said piston having a plate drivingly connected to said one gear and a plate operatively connected to said rods and an assembly fastener fixed only on said rods engaging said other end for holding said fluid actuated reaction means assembled in position with said axial locating surface engaging said axial abutment surface, means on said friction plates, planetary gear means, shaft and cover, so the shaft, the planetary gear means and the fluid actuated reaction means is attached to and supported on said cover plate for handling and assembly into a transmission housing, and said rod having a pilot portion means extending beyond said assembly fastener having a smooth surface with a tapered and adapted for only preventing relative circumferential movement relative to said circumferential locating means and at all times permitting relative axial movement.

20. A transmission assembly, a tubular transmission housing having an open end with axial and radial circumferential locating pads, an axial abutment and circumferential locating abutments for a plurality of rods both located longitudinally centrally on the inner surface; a subassembly comprising the combination of a housing end closure plate adapted for closing said open end of said transmission housing and having an axial pilot surface on one side face and radial pilot pads engaging said axial and radial circumferential locating pads to locate said closure plate in open end of said transmission housing, a circumferentially extending axial locating surface located adjacent and within said pilot pads and a central bearing; a shaft rotatably mounted in said central bearing; planetary gear means including a sun gear, a ring gear and planetary pinions meshing with said sun and ring gears and mounted on a carrier, rotatably mounted and axially located on said shaft entirely on one side adjacent said one face of said cover plate; a plurality of rods fixed to said cover plate and extending on said one side parallel to and circumferentially spaced about said shaft externally of said gear means; fluid actuated reaction means having a circumferentially extending axial engaging surface at one end engaging said axial locating surface and a circumferentially extending axial locating surface at the opposite end for engaging said axial abutment in said transmission housing and non-rotatably fixed to and axially slidable on said rods and one of said gears for retarding said one gear including an annular backing member, an annular fluid motor having a piston cylinder and means for axially locating said fluid motor relative to said backing member, a plurality of annular friction plates located between said backing member and said piston having a plate drivingly connected to said one gear and a plate operatively connected to said rods; assembly fasteners fixed on said rods engaging said other end for holding said fluid actuated reaction means in position with said axial locating surface engaging said axial engaging surface for holding the shaft, the planetary gear means and the fluid actuated reaction means attached to and supported on said cover plate for handling and assembly into a transmission housing and fastening means for fastening said cover plate to said housing with said axial and radial pilot pads engaging said axial and radial locating pads and said engaging surface at one end engaging said locating surface and said engaging surface at the other end engaging said axial abutment to locate the subassembly in said housing and said rods having a pilot portion means extending beyond said assembly fasteners and through said axial abutment for only preventing relative circumferential movement and permitting relative axial movement.

References Cited

UNITED STATES PATENTS

| | | | |
|---|---|---|---|
| 2,200,890 | 5/1940 | Murray | 74—765 X |
| 2,749,767 | 6/1956 | Ebsworth | 74—761 X |
| 3,101,012 | 8/1963 | Christenson et al. | 74—759 X |
| 3,107,766 | 10/1963 | Pritchard. | |
| 3,209,620 | 10/1965 | Moan | 74—761 X |
| 3,224,539 | 12/1965 | Hensel | 192—87.11 X |
| 3,228,501 | 1/1966 | Eason et al. | |
| 3,265,175 | 8/1966 | Croswhite | 192—87 |
| 3,279,573 | 10/1966 | Hensel | 192—87.11 |
| 3,300,004 | 1/1967 | Peterson | 192—87.11 X |
| 3,384,214 | 5/1968 | Wilson | 192—87.11 |

ARTHUR T. McKEON, Primary Examiner

U.S. Cl. X.R.

74—761, 765